US010529487B2

United States Patent
Mochigi et al.

(10) Patent No.: US 10,529,487 B2
(45) Date of Patent: Jan. 7, 2020

(54) MULTILAYER CERAMIC CAPACITOR WITH INTERNAL ELECTRODES HAVING DIFFERENT EDGE POSITIONS

(71) Applicant: TAIYO YUDEN CO., LTD., Taito-ku, Tokyo (JP)

(72) Inventors: Masaki Mochigi, Takasaki (JP); Yousuke Nakada, Takasaki (JP); Shinichi Tsunoda, Takasaki (JP); Yasuyuki Mashimo, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/604,393

(22) Filed: May 24, 2017

(65) Prior Publication Data

US 2017/0352483 A1 Dec. 7, 2017

(30) Foreign Application Priority Data

Jun. 7, 2016 (JP) .................................. 2016-113924

(51) Int. Cl.
*H01G 4/30* (2006.01)
*H01G 4/012* (2006.01)
(Continued)

(52) U.S. Cl.
CPC .............. *H01G 4/30* (2013.01); *H01G 4/012* (2013.01); *H01G 4/232* (2013.01); *H01G 4/1227* (2013.01)

(58) Field of Classification Search
CPC ...... H01G 4/012; H01G 4/1227; H01G 4/232; H01G 4/30
See application file for complete search history.

(56) References Cited

U.S. PATENT DOCUMENTS 5,268,342 A * 12/1993 Nishiyama ........... H01G 4/1227
501/138
5,812,363 A * 9/1998 Kuroda .................... H01G 4/30
361/306.3
(Continued)

FOREIGN PATENT DOCUMENTS

JP 61162037 U1 10/1986
JP 04171708 A * 6/1992
(Continued)

OTHER PUBLICATIONS

Non-Final Office Action issued by U.S. Patent and Trademark Office, dated Jul. 17, 2018, for U.S. Appl. No. 15/635,118.
(Continued)

*Primary Examiner* — David M Sinclair
(74) *Attorney, Agent, or Firm* — Law Office of Katsuhiro Arai (57) ABSTRACT

A multilayer ceramic capacitor includes: a multilayer structure in which internal electrodes and dielectric layers are alternately stacked; a first external electrode connected to a subset of the internal electrodes; and a second external electrode sandwiching the multilayer structure with the first external electrode in a first direction is connected to another subset of the internal electrodes, wherein $t1^2 \times W1/N$ is equal to or more than 0.1, when a distance between a first edge positioned at outermost of the internal electrodes in a second direction intersecting with the first direction in a plane direction of the internal electrodes and the dielectric layers and a second edge positioned at innermost of the internal electrodes in the second direction is W1 (mm), each thickness of the plurality of dielectric layers is t1 (μm), and a stack number of the plurality of dielectric layers is N.

9 Claims, 10 Drawing Sheets

(51) Int. Cl.
*H01G 4/232* (2006.01)
*H01G 4/12* (2006.01)

(56) References Cited

U.S. PATENT DOCUMENTS

| | | | | |
|---|---|---|---|---|
| 5,835,338 A * | 11/1998 | Suzuki | ............. | H01G 4/30 361/301.4 |
| 6,473,292 B1 * | 10/2002 | Yoshida | ............. | H01G 4/30 361/301.4 |
| 7,307,829 B1 * | 12/2007 | Devoe | ............. | H01G 2/065 361/303 |
| 7,436,650 B2 | 10/2008 | Oguni et al. | | |
| 7,715,172 B2 | 5/2010 | Kawasaki et al. | | |
| 7,859,821 B2 | 12/2010 | Shimizu | | |
| 9,318,263 B2 | 4/2016 | Seo | | |
| 9,595,386 B2 * | 3/2017 | You | ............. | H01G 4/30 |
| 9,653,214 B2 | 5/2017 | Hattori et al. | | |
| 2002/0041061 A1 * | 4/2002 | Nomura | ............. | C04B 35/468 264/614 |
| 2012/0307418 A1 * | 12/2012 | Kim | ............. | H01G 4/30 361/321.2 |
| 2012/0327556 A1 * | 12/2012 | Ahn | ............. | H01G 4/30 361/321.2 |
| 2013/0135787 A1 * | 5/2013 | Lim | ............. | H01G 4/30 361/301.4 |
| 2014/0177127 A1 * | 6/2014 | Kim | ............. | H01G 4/30 361/301.4 |
| 2014/0185186 A1 | 7/2014 | Lee et al. | | |
| 2014/0362492 A1 * | 12/2014 | Lee | ............. | H01G 4/30 361/301.4 |
| 2017/0352483 A1 | 12/2017 | Mochigi et al. | | |
| 2018/0374643 A1 | 12/2018 | Inomata et al. | | |

FOREIGN PATENT DOCUMENTS

| | | | |
|---|---|---|---|
| JP | 09260202 A | * | 10/1997 |
| JP | H09260202 A | | 10/1997 |
| JP | 10335168 A | * | 12/1998 |
| JP | 2000040634 A | * | 2/2000 |
| JP | 2000124057 A | * | 4/2000 |
| JP | 2000306761 A | | 11/2000 |
| JP | 2002184648 A | * | 6/2002 |
| JP | 2004022859 A | | 1/2004 |
| JP | 2006013245 A | * | 1/2006 |
| JP | 2009200092 A | | 9/2009 |

OTHER PUBLICATIONS

Final Office Action issued by U.S. Patent and Trademark Office, dated Nov. 15, 2018, for U.S. Appl. No. 15/635,118.
A Notification of Reasons for Refusal issued by the Japanese Patent Office, dated Jan. 8, 2019, for related Japanese application No. 2016-113924.
A Notification of Reasons for Refusal issued by the Japanese Patent Office, dated Feb. 19, 2019, for related Japanese application No. 2016-113924. (8 pages).
Notice of Allowance issued by U.S. Patent and Trademark Office, dated Mar. 8, 2019, for U.S. Appl. No. 15/635,118 (16 pages).

* cited by examiner

| | L [mm] | W [mm] | T [mm] | Wi [mm] | W1 [mm] | SM [mm] | t1 [μm] | N | [(t1)² × W1]/N | BDV [V] |
|---|---|---|---|---|---|---|---|---|---|---|
| EXAMPLE 1 | 24 | 59 | 4.1 | 52 | 2.4 | 2.3 | 28.4 | 120 | 16.1 | 1669 |
| EXAMPLE 2 | 34 | 39 | 4.5 | 32 | 2.4 | 2.3 | 13.3 | 204 | 2.1 | 818 |
| EXAMPLE 3 | 34 | 39 | 4.5 | 32 | 2.4 | 2.3 | 26.6 | 108 | 15.7 | 1455 |
| EXAMPLE 4 | 34 | 39 | 4.5 | 32 | 2.4 | 2.3 | 39.9 | 72 | 53.1 | 2120 |
| EXAMPLE 5 | 34 | 39 | 4.5 | 32 | 2.4 | 2.3 | 61.3 | 64 | 140.9 | 3171 |
| EXAMPLE 6 | 24 | 29 | 4.6 | 26 | 2.4 | 2.3 | 15.5 | 213 | 2.7 | 750 |
| EXAMPLE 7 | 24 | 19 | 3.4 | 15 | 2.4 | 0.3 | 27.3 | 83 | 21.6 | 1365 |
| EXAMPLE 8 | 14 | 19 | 3.3 | 15 | 1.2 | 0.8 | 26.1 | 68 | 12.1 | 1441 |
| EXAMPLE 9 | 14 | 19 | 4.1 | 15 | 1.2 | 0.8 | 35.6 | 81 | 18.8 | 1475 |
| COMPARATIVE EXAMPLE 1 | 24 | 59 | 4.1 | 52 | 0.01 | 3.5 | 28.4 | 120 | 0.07 | 435 |
| COMPARATIVE EXAMPLE 2 | 34 | 39 | 4.5 | 32 | 0.01 | 3.5 | 13.3 | 204 | 0.01 | 549 |

MULTILAYER CERAMIC CAPACITOR WITH INTERNAL ELECTRODES HAVING DIFFERENT EDGE POSITIONS

CROSS-REFERENCE TO RELATED APPLICATION

This application is based upon and claims the benefit of priority of the prior Japanese Patent Application No. 2016-113924, filed on Jun. 7, 2016, the entire contents of which are incorporated herein by reference.

FIELD

A certain aspect of the present invention relates to a multilayer ceramic capacitor.

BACKGROUND

There is known a technology in which an overlap area of internal electrodes is enlarged in order to improve a withstand voltage of a multilayer ceramic capacitor (see Japanese Patent Application Publication No. 2000-306761). There is known a technology in which sides of a plurality of internal electrodes do not coincide with each other in a stack direction in order to improve a withstand voltage (see Japanese Patent Application Publication No. 2009-200092).

SUMMARY OF THE INVENTION

However, the withstand voltage is not sufficiently improved, in the technologies.

According to an aspect of the present invention, there is provided a multilayer ceramic capacitor including: a multilayer structure in which each of a plurality of internal electrodes and each of a plurality of dielectric layers are alternately stacked; a first external electrode that is connected to a subset of the plurality of internal electrodes; and a second external electrode that sandwiches the multilayer structure with the first external electrode in a first direction is connected to another subset of the plurality of internal electrodes, wherein $t1^2 \times W1/N$ is equal to or more than 0.1, when a distance between a first edge that is positioned at outermost of the plurality of internal electrodes in a second direction intersecting with the first direction in a plane direction of the plurality of internal electrodes and the plurality of dielectric layers and a second edge that is positioned at innermost of the plurality of internal electrodes in the second direction is W1 (mm), each thickness of the plurality of dielectric layers is t1 (μm), and a stack number of the plurality of dielectric layers is N.

DETAILED DESCRIPTION

Figure 1:
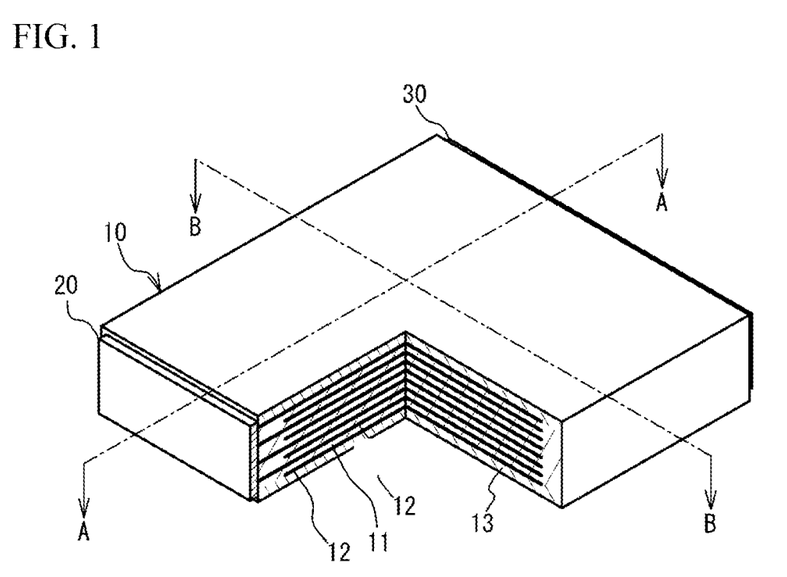
FIG. 1 illustrates a partial perspective view of a multilayer ceramic capacitor in accordance with an embodiment.
Figure 2:
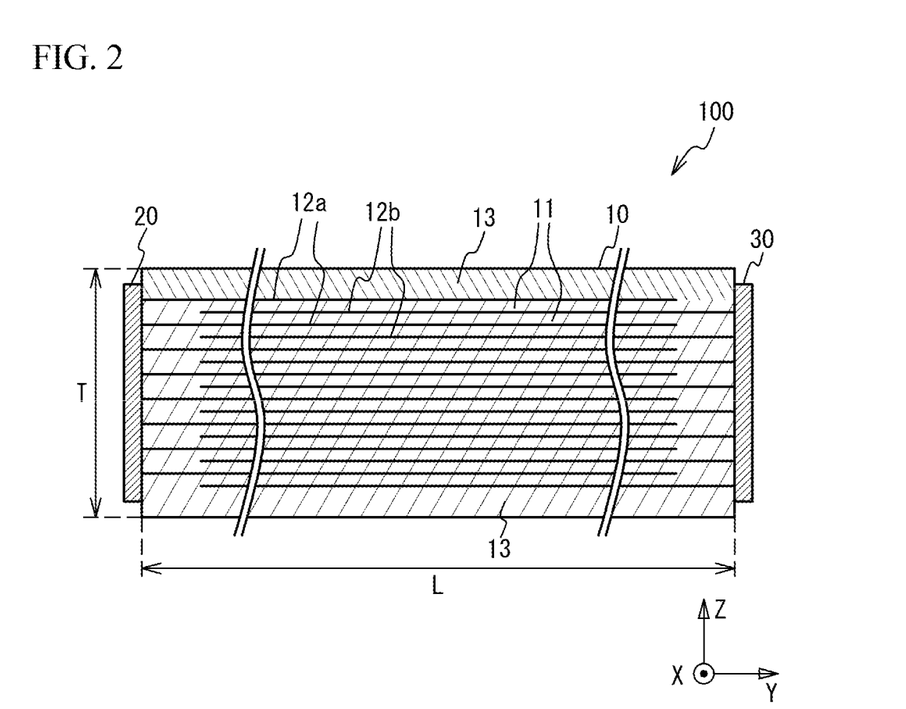
FIG. 2 illustrates a cross sectional view taken along a line A-A of FIG. 1.
Figure 3:
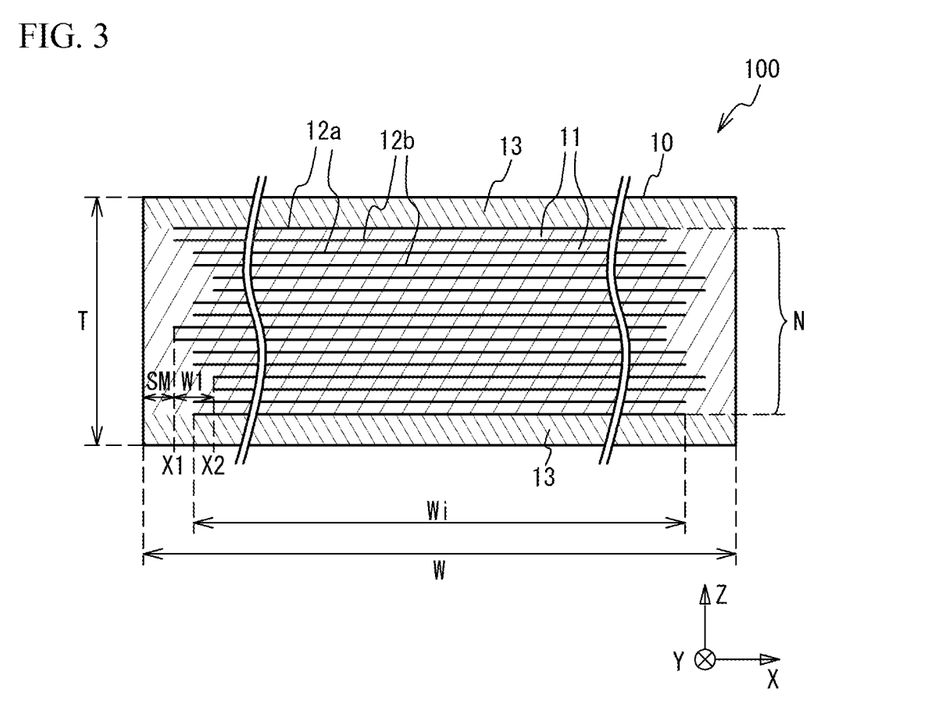
FIG. 3 illustrates a cross sectional view taken along a line B-B of FIG. 1.

A description will be given of an embodiment with reference to the accompanying drawings.
Embodiment A description will be given of a multilayer ceramic capacitor. FIG. 1 illustrates a partial perspective view of a multilayer ceramic capacitor in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, a multilayer ceramic capacitor 100 includes a multilayer structure 10 having a rectangular parallelepiped shape, and a pair of external electrodes 20 and 30 that are provided at edge faces of the multilayer structure 10 facing each other. The multilayer structure 10 has a structure designed to have dielectric layers 11 and internal electrodes 12 alternately stacked. The dielectric layer 11 includes ceramic material acting as a dielectric body. The stack direction of the dielectric layer 11 and the internal electrode 12 is a Z-direction. The facing direction of the external electrodes 20 and 30 is a Y-direction. A direction vertical to the Y-direction and the Z-direction is an X-direction.

End edges of the internal electrodes 12 are alternately exposed to an end face of the multilayer structure 10 on which the external electrode 20 is provided and an end face of the multilayer structure 10 on which the external electrode 30 is provided. Thus, the internal electrodes 12 are alternately conducted to the external electrode 20 and the external electrode 30. In FIG. 2 and FIG. 2, an internal electrode 12a is electrically connected to the external electrode 20. An internal electrode 12b is electrically connected to the external electrode 30. Thus, the multilayer ceramic capacitor 100 has a structure in which a plurality of ceramic capacitors are stacked. And, both edge faces of the multilayer structure 10 in the stack direction of the dielectric layer 11 and the internal electrode 12 are covered by cover layers 13. For example, material of the cover layer 13 is the same as that of the dielectric layer 11. As illustrated in FIG. 3, the edge of the internal electrode 12a is different from the edge of the internal electrode 12b in the X-direction.

A main component of the external electrodes 20 and 30 and the internal electrode 12 is a metal such as nickel (Ni), copper (Cu), tin (Sn), silver (Ag), palladium (Pd), gold (Au), or platinum (Pt). The dielectric layer 11 is mainly composed of a ceramic material having a perovskite structure expressed by a general expression $ABO_3$. The ceramic material of the perovskite structure of the dielectric layer 11 may be $BaTiO_3$ (barium titanate), $SrTiO_3$ (strontium titanate), $CaTiO_3$ (calcium titanate), $MgTiO_3$ (magnesium titanate), $CaZrO_3$ (calcium zirconate), $CaTi_xZr_{1-x}O_3$ (calcium titanate zirconate), $BaZrO_3$ (barium zirconate), or $PbTi_xZr_{1-x}O_3$ (lead titanate zirconate: PZT). The ceramic material of the dielectric layer 11 may be $TiO_2$ (titanium oxide). The dielectric layer 11 may be made of sintered material. The dielectric layer 11 is isotropic with respect to a crystal orientation at a macro level. The ceramic material of the perovskite structure may have an off-stoichiometric composition. First, specified additive compounds may be added to the ceramic material. The additive compound may be at least one of oxidation materials of Mg (magnesium), Mn (manganese), V (vanadium), Cr (chromium), and oxidation materials of rare-earth elements (Y (yttrium), Dy (dysprosium), Tm (thulium), Ho (holmium), Tb (terbium), Yb (ytterbium), Er (erbium), Sm (samarium), Eu (europium), Gd (gadolinium)), Co (cobalt), Li (lithium), B (boron), Na (sodium), K (potassium), and Si (silicon), or glass.

As illustrated in FIG. 2 and FIG. 3, a thickness of the multilayer structure in the Z-direction is "T". A length of the multilayer structure 10 in the Y-direction is "L". A width of the multilayer structure 10 in the X-direction is "W". Each thickness of the dielectric layer 11 is "t1". A width of the internal electrode 12 in the X-direction is "Wi". A distance between a position X1 and a position X2 is a deviation amount W1. The position X1 is an outermost edge of edges of the internal electrodes 12 in the X-direction. The position X2 is an innermost edge of the edges of the internal electrodes 12 in the X-direction. A distance from the edge of the outermost internal electrode 12 to the edge face of the multilayer structure 10 is a side margin "SM". The stack number of the dielectric layer 11 is "N".

The present inventors thought the following electrostrictive effect as a reason that a withstand voltage of a multilayer ceramic capacitor is reduced. When a voltage is applied between the internal electrode 12a and the internal electrode 12b, a stress occurs in the multilayer structure 10 because of the electrostrictive effect. A crack occurs in a region in which stress is condensed. The multilayer ceramic capacitor is broken because of the crack or the like.

Figure 4A:
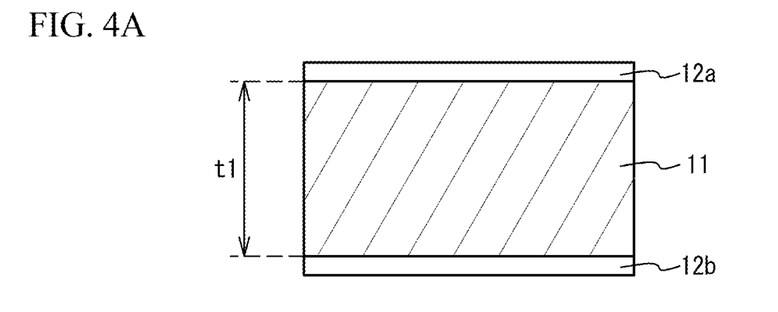
FIG. 4A and FIG. 4B illustrate one ceramic capacitor.
Figure 4B:
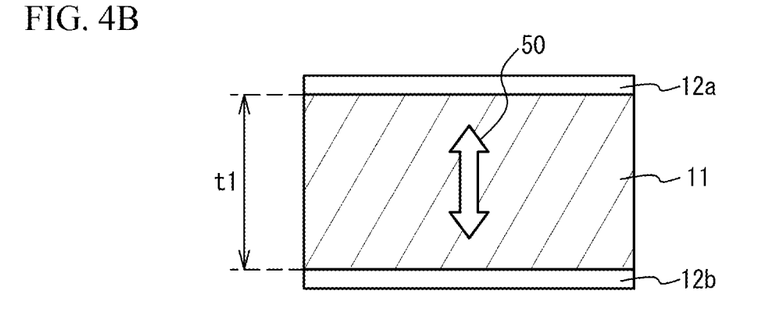

FIG. 4A and FIG. 4B illustrate one ceramic capacitor. As illustrated in FIG. 4A, the internal electrode 12a is provided over the dielectric layer 11 having a thickness "t1", and the internal electrode 12b is provided under the dielectric layer 11. As illustrated in FIG. 4B, a positive voltage is applied to the internal electrode 12a with respect to the internal electrode 12b. In this case, an electrical field is applied to the dielectric layer 11 in the stack direction. Therefore, a displacement extending in the stack direction occurs in the dielectric layer 11 because of the electrostrictive effect as indicated by an arrow 50.

Figure 5:
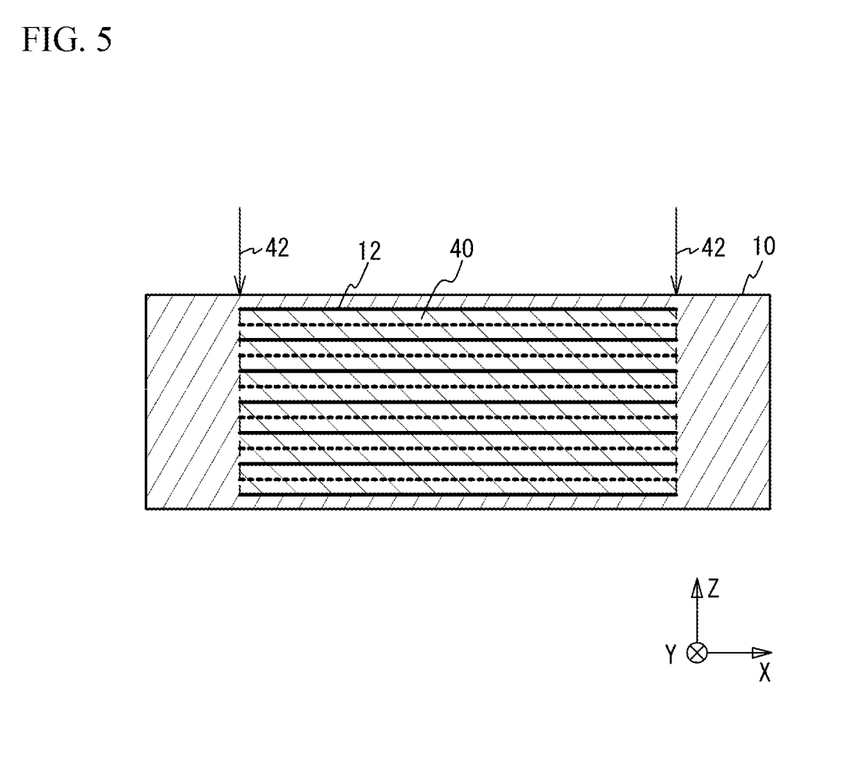
FIG. 5 illustrates a cross sectional view of a multilayer ceramic capacitor in accordance with a comparative embodiment.

FIG. 5 illustrates a cross sectional view of a multilayer ceramic capacitor in accordance with a comparative embodiment. As illustrated in FIG. 5, the internal electrode 12a connected to the external electrode 20 is illustrated by a dotted line. The internal electrode 12b connected to the external electrode 30 is illustrated by a solid line. Edges of the internal electrodes 12 in the X-direction approximately coincide with each other. A region of the dielectric layer 11 in which displacement occurs because of the electrostrictive effect is a region 40 sandwiched by the internal electrodes 12 in the Z-direction. A hatch direction of the region 40 is inverted with respect to another region of the dielectric layer 11, in order to distinguish the region 40 from another region of the dielectric layer 11. In the multilayer structure, stress tends to be condensed to a region in which the displacement rapidly changes. Therefore, the stress tends to be condensed to the edge of the internal electrode 12 as indicated by an arrow 42.

Figure 6:
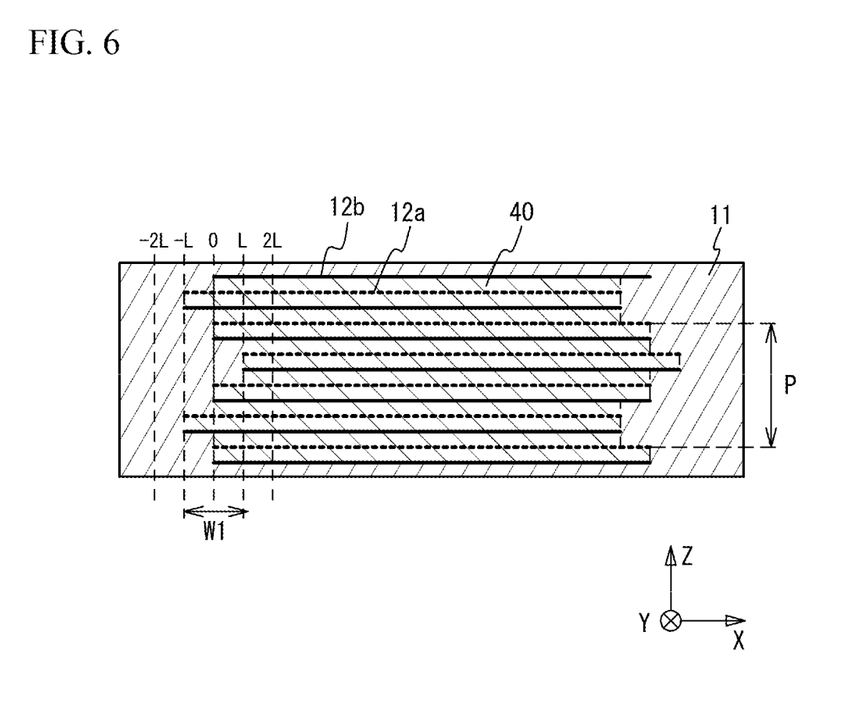
FIG. 6 illustrates a cross sectional view of a multilayer ceramic capacitor in accordance with an embodiment.

An overall displacement amount "ΔDt" of the stacked dielectric layers 11 caused by the electrostrictive effect is a displacement amount "ΔD" of one dielectric layer 11 multiplied by the stack number "N" of the dielectric layer 11. That is, ΔDt=ΔD×N. The displacement amount "ΔD" in one dielectric layer 11 is proportional to a square of electrical field intensity in the dielectric layer 11. The electric field intensity is inversely proportional to the thickness "t1" of the dielectric layer 11. That is, $\Delta D \times 1/(t1)^2$. Therefore, $\Delta Dt \times (1)^2$ FIG. 6 illustrates a cross sectional view of a multilayer ceramic capacitor in accordance with the embodiment. As illustrated in FIG. 6, edges of the internal electrodes 12 in the X-direction are different from each other. In this example, one internal electrode 12a and one internal electrode 12b adjacent to each other are treated as one group. The position of the edges of the groups in the X-direction is changed in three steps that are +L, 0 and −L. One period "P" includes eight dielectric layers 11. In this case, the deviation amount "W1" is 2L.

In one period "P", the number of the dielectric layers 11 included in the positions −2L, −L, 0, L and 2L is zero, one, five, eight and zero. Therefore, the overall displacement amount "ΔDt" in each position is as the follows.

the position −2L: 0
the position −L: (1/8)×N×ΔD
the position 0: (5/8)×N×ΔD
the position L: (8/8)×N×ΔD
the position 2L: (0/8)×N×ΔD The stress corresponds to an inclination of the displacement amount with respect to the position. Therefore, the stress between each position is as follows.

the position −2.5L: 0
the position −1.5L: (1/8)×N×ΔD/L
the position −0.5L: (1/2)×N×ΔD/L
the position 0.5L: (3/8)×N×ΔD/L
the position 1.5L: 0

L0 is a fixed value. "L" is changed in five steps. And, each stress is calculated. The five steps include L=0.5×L0,0.75× L0,1.0×L0, 1.5×L0, and 2.0×L0. The maximum stress at L=0.5×L0 is 1. And, the stress is normalized.

Figure 7:
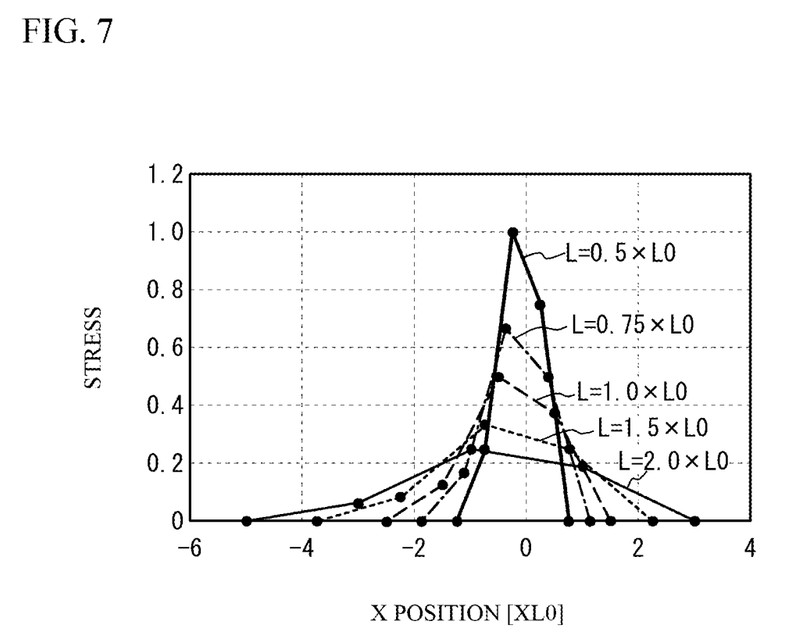
FIG. 7 illustrates stress with respect to a calculated X position.

FIG. 7 illustrates stress with respect to the calculated X position. As illustrated in FIG. 7, when "L" is enlarged, a maximum value of the stress is reduced. The value of the stress becomes the maximum when the position in the X-direction is −0.5L. The maximum value is inversely proportional to "L".

In this manner, the maximum value of the stress is proportional to "N" and "ΔD" and is inversely proportional to "L" (that is, W1). "ΔD" is inversely proportional to $(t1)^2$. Therefore, the maximum value of the stress is proportional to "N" and is inversely proportional to "L" (that is, W1) and "t1". That is, the maximum value of the stress is proportional to $N/[(t1)^2 \times W1]$. The withstand voltage BDV of the multilayer ceramic capacitor is as follows when the withstand voltage BDV is inversely proportional to the maximum value of the stress.

$$BDV \propto [(t1)^2 \times W1]]/N \qquad (1)$$

Actually, even if the BDV is not strictly proportional to $[(t1)^2 \times W1]]/N$, the BDV becomes larger when $[(t1)^2 \times W1]]$ becomes larger. In order to downsize the multilayer ceramic capacitor and enlarge capacity of the multilayer ceramic capacitor, it is necessary to reduce "t1" and enlarge "N". Therefore, the withstand voltage becomes smaller. And so, in the embodiment, the deviation amount "W1" is enlarged. Thus, the withstand voltage BDV can be improved.

On the basis of the above-description, with respect to the dielectric layer 11 having the electrostrictive effect, the formula (1) or a correlation corresponding to the formula (1) is satisfied. And, the formula (1) is generally satisfied regardless of a pattern in which the internal electrode 12 is shifted in the X-direction.

Figure 8:
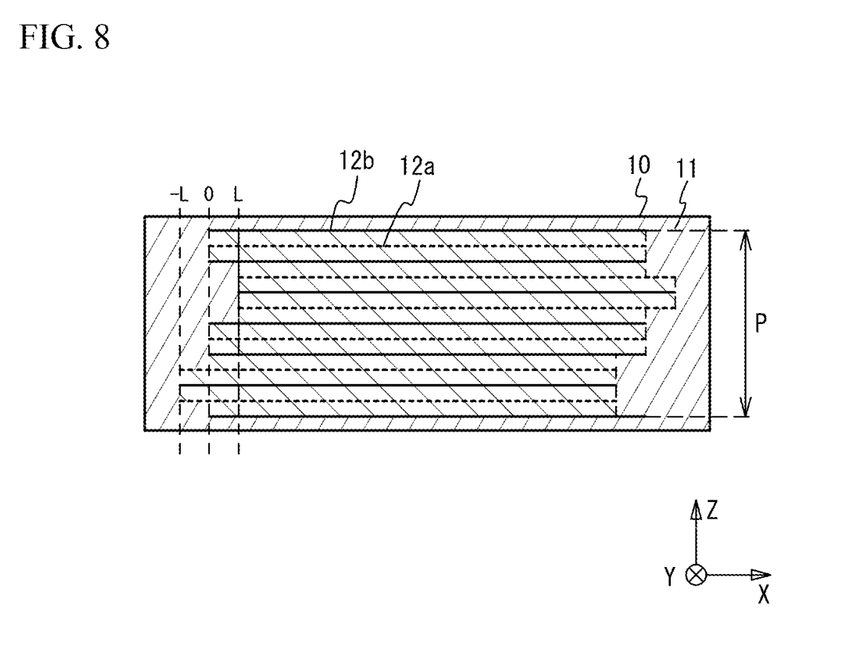
FIG. 8 illustrates a cross sectional view of a multilayer ceramic capacitor in accordance with another embodiment.

FIG. 8 illustrates a cross sectional view of the multilayer ceramic capacitor in accordance with another embodiment.

As illustrated in FIG. 8, three internal electrodes 12 adjacent to each other are treated as one group. The position of the edges of groups is changed to 0, L, 0 and –L in this order. In the example, in one period "P", twelve dielectric layers 11 are included. The number of the dielectric layers 11 included in the group of which position of the edge is changed is arbitrary.

The number of the internal electrodes 12 in the group of the position 0 may be two, and the number of the internal electrodes 12 in the group of the position L and the group of the position –L may be three. In this manner, the number of the internal electrodes 12 in one group may be changed.

Moreover, the position of the edges of the internal electrodes 12 in the X-direction may be changed in steps other than three steps such as 0, L, 2L, L, 0, –L, –2L and –L.

In the embodiment, the internal electrodes 12a (the first internal electrode) that are a subset of the plurality of internal electrodes 12 are electrically connected to the external electrode 20 (the first external electrode). The internal electrodes 12b (the second internal electrode) that are another subset of the plurality of internal electrodes 12 are electrically connected to the external electrode 30. The external electrode 30 and the external electrode 20 sandwich the multilayer structure 10 in the Y-direction (the first direction). In the multilayer ceramic capacitor, $t1^2 \times W1/N$ is equal to or more than a predetermined value. "W1" (mm) is a distance between the first edge that is the outermost of the edges of the plurality of internal electrodes 12 in the X-direction (a second direction intersecting with the first direction in a face direction of the internal electrode 12 and the dielectric layer 11) and the second edge that is the innermost of the edges of the plurality of internal electrodes 12 in the X direction. "t1" (μm) is a layer thickness of each dielectric layer 11. "N" is a stack number of the plurality of dielectric layers 11.

Thus, the stress caused by the electrostrictive effect is dispersed and the withstand voltage can be improved. It is preferable that $t1^2 \times W1/N$ is equal to or more than 0.1. It is more preferable that $t1^2 \times W1/N$ is equal to or more than 0.5. It is still more preferable that $t1^2 \times W1/N$ is equal to or more than 1. When $t1^2 \times W1/N$ is large, the width of the multilayer structure 10 becomes larger in the X-direction. Therefore, it is preferable that $t1^2 \times W1/N$ is equal to or less than 2. It is more preferable that $t1^2 \times W1/N$ is equal to or less than 1.

When the electrostrictive effect of the dielectric layer 11 is large, the stress becomes larger and the withstand voltage becomes smaller. It is therefore preferable that the deviation amount "W1" is large. A sintered material of which main component is barium titanate is used as a material having large electrostrictive effect.

It is preferable that the positions of the edges of the plurality of internal electrodes 12 in the Y-direction are periodically arranged. In this case, tension can be evenly dispersed. It is therefore possible to disperse the stress. And it is possible to improve the withstand voltage.

Each group has a plurality of internal electrodes 12 that have the same edge position in the Y-direction and are adjacent to each other. In this case, it is preferable that the edge position of group is different from each other. Thus, the tension can be evenly dispersed. It is therefore possible to evenly disperse the stress. And the withstand voltage can be improved.

The large multilayer ceramic capacitor of which operation voltage is high has a large stress caused by the electrostrictive effect. It is therefore preferable that the deviation amount "W1" is enlarged in the multilayer ceramic capacitor of which operation voltage is equal to or more than 100V or 200V. And, it is preferable that the deviation amount "W1" is enlarged in the multilayer ceramic capacitor of which length "L" and width "W" are equal to 10 mm or more.

EXAMPLES

The multilayer ceramic capacitors in accordance with the embodiment were manufactured. The main component of the internal electrode 12 and the external electrodes 20 and 30 was nickel. The main component of the dielectric layer 11 was barium titanate. Examples 1 to 9 and comparative examples 1 and 2 were manufactured. The withstand voltage BDV of the manufactured samples was measured. In the measurement of the BDV, a direct current is applied between the external electrode 20 and the external electrode 30. An increasing speed of the voltage was 50 sec/1 kV. The voltage at which the sample was broken was the withstand voltage BDV.

Figure 9:
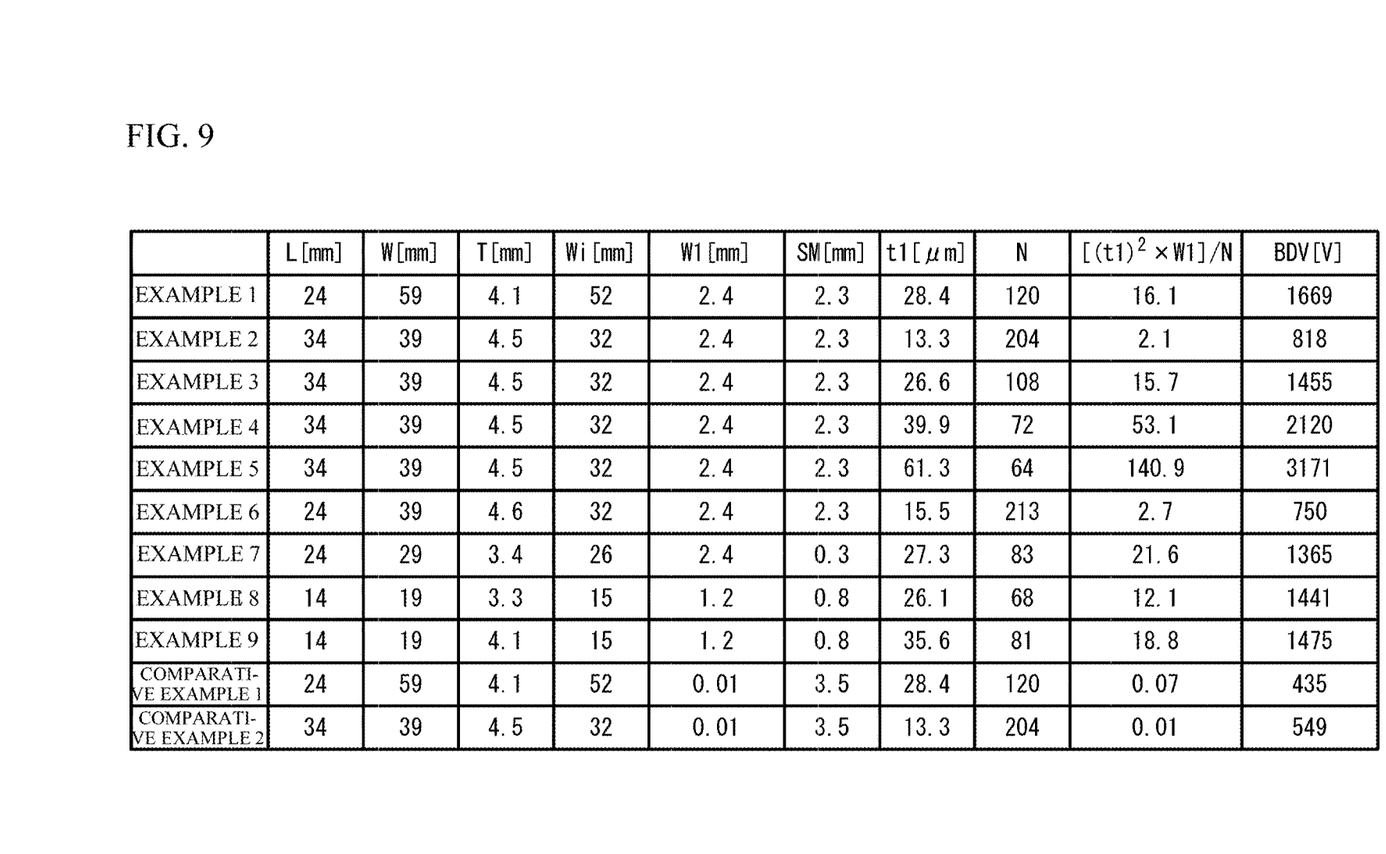
FIG. 9 illustrates each size of each sample of examples and comparative examples.

FIG. 9 illustrates each size of each sample of the examples and the comparative examples. As illustrated in FIG. 9, the length "L" of the multilayer structure 10 was 14 mm to 34 mm. The width "W" of the multilayer structure 10 was 19 mm to 59 mm. The thickness "T" of the multilayer structure 10 was 3.3 mm to 4.6 mm. The width "Wi" of the internal electrode 12 was 15 mm to 52 mm. The width of the all internal electrodes 12 was common. The deviation amount "W1" was 1.2 mm to 2.4 mm in the examples. The deviation amount "W1" was 0.01 mm or less in the comparative examples. The side margin "SM" was 0.3 mm to 3.5 mm. The thickness "t1" of the dielectric layer 11 was 13.3 μm to 61.3 μm. The stack number N was 64 to 213.

Figure 10:
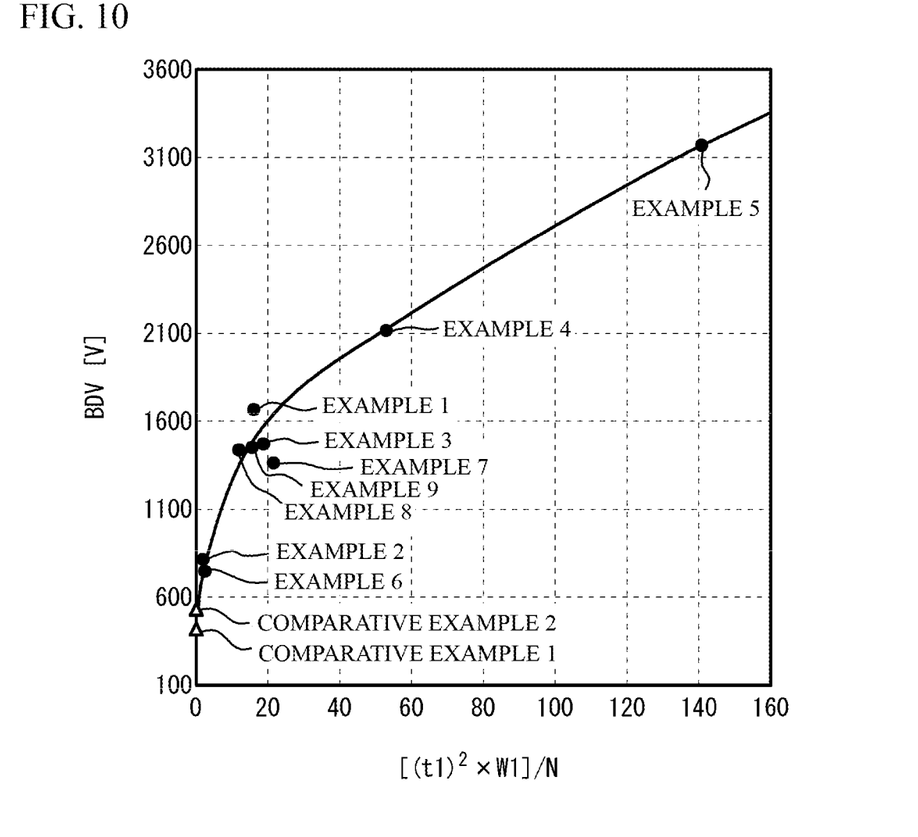
FIG. 10 illustrates a withstand voltage BDV with respect to $t1^2 \times W1/N$ of examples and comparative examples.

FIG. 10 illustrates the withstand voltage BDV with respect to $t1^2 \times W1/N$ of the examples and the comparative examples. Black circles are measured results of the examples. White triangles are measured result of the comparative examples. A solid line is an auxiliary line indicating a trend. As illustrated in FIG. 10, the withstand voltage BDV is not proportional to $[(t1)^2 \times W1]/N$ but has a good correlation with $[(t1)^2 \times W1]/N$. From the results, the withstand voltage BDV mainly depends on $[(t1)^2 \times W1]/N$ and hardly depends on another size.

In the comparative examples, the withstand voltage is approximately 500 V. When the auxiliary line is referred, the withstand voltage BDV is larger than that of the comparative examples in a case where $[(t1)^2 \times W1]/N$ is equal to or more than 0.1. When $[(t1)^2 \times W1]/N$ is equal to or more than 1, the withstand voltage is equal to or more than 600 V. The difference is significant. When $[(t1)^2 \times W1]/N$ is equal to or more than 5, the withstand voltage BDV is equal to or more than 1000V. Therefore, the withstand voltages BDV of the examples are twice or more than those of the comparative examples. When $[(t1)^2 \times W1]/N$ is equal to or more than 20, the withstand voltage BDV is equal to or more than 1500V. Therefore, the withstand voltages BDV of the examples are three times or more than those of the comparative examples. When $[(t1)^2 \times W1]/N$ is equal to or more than 50, the withstand voltage BDV is equal to or more than 2000V. Therefore, the withstand voltages BDV of the examples are four times or more than those of the comparative examples. When $[(t1)^2 \times W1]/N$ is equal to or more than 80, the withstand voltage BDV is equal to or more than 2500V. Therefore, the withstand voltages BDV of the examples are five times or more than those of the comparative examples.

When FIG. 10 is reviewed more, the withstand voltage of the example 7 is slightly smaller than the auxiliary line. As illustrated in FIG. 9, in the example 7, the side margin "SM" is 0.3 mm and is smaller than other examples. When the side margin "SM" is small, it is thought that the stress is not evenly dispersed around the side face of the multilayer structure 10 and the withstand voltage is reduced. In the examples 8 and 9, even if the side margin "SM" is 0.8 mm, the withstand voltage BDV is approximately the same as the auxiliary line. Therefore, it is preferable that the side margin "SM" is larger than 0.3 mm. It is more preferable that the side margin "SM" is equal to or more than 0.5 mm. It is still more preferable that the side margin "SM" is equal to or more than 0.8 mm. From a viewpoint of enlarging the deviation amount "W1", it is preferable that the deviation amount "W1" is equal to or more than the side margin "SM". However, when the deviation amount "W1" is eight times as much as the side margin "SM", the withstand voltage is reduced, as in the case of the example 7. On the other hand, in the examples 8 and 9, when the deviation amount "W1" is 1.5 times as much as the side margin "SM", the withstand voltage BDV is not reduced. Therefore, it is preferable that the deviation amount "W1" is less than eight times as much as the side margin "SM". It is more preferable that the deviation amount "W1" is equal to or less than five times as much as the side margin "SM". It is still more preferable that the deviation amount "W1" is equal to or less than 1.5 times as much as the side margin "SM".

Moreover, as illustrated in FIG. 10, the withstand voltage BDV of the example 1 is slightly larger than the auxiliary line. As illustrated in FIG. 9, in the example 1, the width "Wi" of the internal electrode 12 is 52 mm and is larger than widths of other examples. This is because the stress can be evenly dispersed, when the width "Wi" of the internal electrode 12 is large. From the viewpoint, it is preferable that the width "Wi" of the internal electrode 12 is equal to or more than 10 mm. It is more preferable that the width "Wi" of the internal electrode 12 is equal to or more than 30 mm. It is still more preferable that the width "Wi" of the internal electrode 12 is equal to or more than 50 mm. As in the cases of the other examples, the withstand voltage BDV is sufficiently high when the deviation amount "W1" is 5% to 10% of the width "Wi" of the internal electrode 12. As in the case of the example 1, it is preferable that the deviation amount "W1" is equal to or less than 5% of the width "Wi" of the internal electrode 12.

Although the embodiments of the present invention have been described in detail, it is to be understood that the various change, substitutions, and alterations could be made hereto without departing from the spirit and scope of the invention.

What is claimed is:
1. A multilayer ceramic capacitor comprising:
a multilayer structure in which each of a plurality of internal electrodes and each of a plurality of dielectric layers are alternately stacked;
a first external electrode that is connected to a subset of the plurality of internal electrodes; and
a second external electrode that sandwiches the multilayer structure with the first external electrode in a first direction is connected to another subset of the plurality of internal electrodes,
wherein $t1^2 \times W1/N$ is more than 5, when a distance between a first edge that is positioned at outermost of the plurality of internal electrodes in a second direction intersecting with the first direction in a plane direction of the plurality of internal electrodes and the plurality of dielectric layers and a second edge that is positioned at innermost of the plurality of internal electrodes in the second direction is W1 (mm), each thickness of the plurality of dielectric layers is t1 (μm), and a stack number of the plurality of dielectric layers is N, and the edges of the plurality of internal electrodes in the second direction included in the multilayer structure are cyclically positioned in one stack direction of the multilayer structure, wherein a number of the plurality of internal electrodes in the stack direction included in the multilayer structure is more than a number of the plurality of internal electrodes in the stack direction included in one cycle which is constituted by at least three different positions of edges of a plurality of internal electrodes included in the subset in the second direction and at least three different positions of edges of a plurality of internal electrodes included in the another subset in the second direction, wherein:
when a group of internal electrodes is defined as a plurality of internal electrodes that have the same edge position in the second direction and are adjacent to each other,
multiple groups are provided in the stacking direction and the edge positions of the multiple groups are different from each other in the second direction, and
each of the multiple groups includes at least one of the plurality of internal electrodes included in the subset and at least one of the plurality of internal electrodes included in the another subset.

2. The multilayer ceramic capacitor as claimed in claim 1, wherein the dielectric layer includes barium titanate.

3. The multilayer ceramic capacitor as claimed in claim 1, wherein the W1 is less than eight times as much as a distance between the first edge and an edge of the multilayer structure in the second direction.

4. The multilayer ceramic capacitor as claimed in claim 1, wherein the W1 is less than 5% of a width of the internal electrode in the second direction.

5. The multilayer ceramic capacitor as claimed in claim 1, wherein $t1^2 \times W1/N$ is more than 20.

6. The multilayer ceramic capacitor as claimed in claim 1, wherein $t1^2 \times W1/N$ is more than 40.

7. The multilayer ceramic capacitor as claimed in claim 1, wherein
the edges of the plurality of internal electrodes of the subset are positioned at at least three different positions in the second direction in each of both edge parts of the plurality of internal electrodes included in the subset in the second direction, and
the edges of the plurality of internal electrodes of the another subset are positioned at at least three different positions in the second direction in each of both edge parts of the plurality of internal electrodes included in the another subset in the second direction.

8. A multilayer ceramic capacitor comprising:
a multilayer structure in which each of a plurality of internal electrodes and each of a plurality of dielectric layers are alternately stacked, the plurality of dielectric layers including barium titanate;
a first external electrode that is connected to a subset of the plurality of internal electrodes; and
a second external electrode that sandwiches the multilayer structure with the first external electrode in a first direction is connected to another subset of the plurality of internal electrodes,
wherein $t1^2 \times W1/N$ is equal to or more than 0.5, when a distance between a first edge that is positioned at outermost of the plurality of internal electrodes in a second direction intersecting with the first direction in a plane direction of the plurality of internal electrodes and the plurality of dielectric layers and a second edge that is positioned at innermost of the plurality of internal electrodes in the second direction is W1 (mm), each thickness of the plurality of dielectric layers is t1 (μm), and a stack number of the plurality of dielectric layers is N, and the edges of the plurality of internal electrodes in the second direction included in the multilayer structure are cyclically positioned in one stack direction of the multilayer structure, wherein a number of the plurality of internal electrodes in the stack direction included in the multilayer structure is more than a number of the plurality of internal electrodes in the stack direction included in one cycle which is constituted by at least three different positions of edges of a plurality of internal electrodes included in the subset in the second direction and at least three different positions of edges of a plurality of internal electrodes included in the another subset in the second direction, wherein:

when a group of internal electrodes is defined as a plurality of internal electrodes that have the same edge position in the second direction and are adjacent to each other, multiple groups are provided in the stacking direction and the edge positions of the multiple groups are different from each other in the second direction, and each of the multiple groups includes at least one of the plurality of internal electrodes included in the subset and at least one of the plurality of internal electrodes included in the another subset.

9. The multilayer ceramic capacitor as claimed in claim 8, wherein the edges of the plurality of internal electrodes of the subset are positioned at at least three different positions in the second direction in each of both edge parts of the plurality of internal electrodes included in the subset in the second direction, and the edges of the plurality of internal electrodes of the another subset are positioned at at least three different positions in the second direction in each of both edge parts of the plurality of internal electrodes included in the another subset in the second direction.

* * * * *